United States Patent
Chiu et al.

(10) Patent No.: US 7,206,391 B2
(45) Date of Patent: Apr. 17, 2007

(54) METHOD FOR CREATING AND DEPLOYING SYSTEM CHANGES IN A VOICE APPLICATION SYSTEM

(75) Inventors: Leo Chiu, Daly City, CA (US); Steven Clive Ehrlich, Burlingame, CA (US)

(73) Assignee: Apptera Inc., San Bruno, CA (US)

( * ) Notice: Subject to any disclaimer, the term of this patent is extended or adjusted under 35 U.S.C. 154(b) by 428 days.

(21) Appl. No.: 10/861,078

(22) Filed: Jun. 4, 2004

(65) Prior Publication Data

US 2005/0135338 A1    Jun. 23, 2005

Related U.S. Application Data

(63) Continuation-in-part of application No. 10/835,444, filed on Apr. 28, 2004.

(60) Provisional application No. 60/558,921, filed on Apr. 2, 2004, provisional application No. 60/532,271, filed on Dec. 23, 2003.

(51) Int. Cl.
*H04M 1/64* (2006.01)
*G06F 3/00* (2006.01)
*G06F 17/00* (2006.01)

(52) U.S. Cl. .................. 379/88.25; 715/733; 700/94; 379/88.12

(58) Field of Classification Search .................. None
See application file for complete search history.

(56) References Cited

U.S. PATENT DOCUMENTS

| 5,832,062 | A  | * | 11/1998 | Drake | 379/88.16 |
| 6,351,679 | B1 | * | 2/2002  | Ainslie | 700/94 |
| 7,039,168 | B1 | * | 5/2006  | Potts | 379/88.25 |
| 7,062,544 | B1 | * | 6/2006  | Ollis | 709/220 |
| 2004/0247093 | A1 | * | 12/2004 | Potts et al. | 379/88.17 |
| 2006/0095860 | A1 | * | 5/2006  | Wada et al. | 715/771 |

OTHER PUBLICATIONS

U.S. Appl. No. 60/558,921, Chiu et al.
U.S. Appl. No. 10/835,444, Wang et al.
U.S. Appl. No. 60/532,271, Wang et al.

* cited by examiner

*Primary Examiner*—Fan Tsang
*Assistant Examiner*—Joseph T Phan

(57) ABSTRACT

A system for configuring and implementing changes to a voice application system has a first software component and host node for configuring one or more changes; a second software component and host node for receiving and implementing the configured change or changes; and a data network connecting the host nodes. In a preferred embodiment, a pre-configured change-order resulting from the first software component and host node is deployed after pre-configuration, deployment and execution thereof requiring only one action.

18 Claims, 11 Drawing Sheets

METHOD FOR CREATING AND DEPLOYING SYSTEM CHANGES IN A VOICE APPLICATION SYSTEM

CROSS-REFERENCE TO RELATED DOCUMENTS

The present invention claims priority to provisional application Ser. No. 60/558,921 filed on Apr. 2, 2004. The present invention is also a continuation in part (CIP) of co-pending U.S. patent application Ser. No. 10/835,444 filed Apr. 28, 2004 which claims priority to provisional application Ser. No. 60/532,271 filed on Dec. 23, 2003. The disclosures of the above applications are included herein by reference.

FIELD OF THE INVENTION

The present invention is in the area of voice application software systems and pertains particularly to systems for developing and managing voice files linked for service to a voice application deployment system.

BACKGROUND OF THE INVENTION

A speech application is one of the most challenging applications to develop, deploy and maintain in a communications environment. Expertise required for developing and deploying a viable VXML application, for example, includes expertise in computer telephony integration (CTI) hardware and software or a data network telephony (DNT) equivalent, voice recognition software, text-to-speech software, and speech application logic.

With the relatively recent advent of voice extensive markup language (VXML) the expertise require to develop a speech solution has been reduced somewhat. VXML is a language that enables a software developer to focus on the application logic of the voice application without being required to configure underlying telephony components. Typically, the developed voice application is run on a VXML interpreter that resides on and executes on the associated telephony system to deliver the solution.

Voice prompting systems in use to day range from a simple interactive voice response system for telephony to the more state-of-art VXML application system known to the inventors. Anywhere a customer telephony interface may be employed, there may also be a voice interaction system in place to interact with callers in real time. Data network telephony (DNT) equivalents of voice delivery systems also exist like VoIP portals and the like.

Often in both VXML compliant and non-VXML systems, such as computer telephony integrated (CTI) IVRs, voice messaging services and the like, voice prompts are sometimes prerecorded in a studio setting for a number of differing business scenarios and uploaded to the enterprise system server architecture for access and deployment during actual interaction with clients. Pre-recording voice prompts instead of dynamically creating them through software and voice synthesis methods is many times performed when better sound quality, different languages, different voice types, or a combination of the above are desired for the presentation logic of a particular system.

In very large enterprise architectures there may be many thousands of prerecorded voice prompts stored for use by a given voice application. Some of these may not be stored in a same centralized location. One with general knowledge of voice file management will attest that managing such a large volume of voice prompts can be very complicated. For example, in prior-art systems management of voice prompts includes recording the prompts, managing identification of those prompts and manually referencing the required prompts in the application code used in developing the application logic for deployment of those prompts to a client interfacing system. There is much room for error in code referencing and actual development, recording, and sorting batches of voice files can be error prone and time consuming as well.

The inventor knows of a software interface for managing audio resources used in one or more voice applications. The software interface includes a first portion for mapping the audio resources from storage to use-case positions in the one or more voice applications, a portion for accessing the audio resources according to the mapping information and for performing modifications a portion for creating new audio resources; and a portion for replication of modifications across distributed facilities. In a preferred application a developer can modify or replace existing audio resources and replicate links to the application code of the applications that use them.

VXML-compliant and other types of voice systems may frequently need to be modified or updated, sometimes multiple times per day due to fast-paced business environments, rapidly evolving business models, special temporary product promotions, sales discounts and so on. For example, if a product line goes obsolete, existing voice prompts related to that product line that are operational in a deployed voice application may need to be modified, replaced or simply deleted. Moreover, configuration settings of a voice application interaction system may also need to be updated or modified from time to time due to addition of new hardware, software, and so on.

The software application mentioned above as known to the inventor for managing audio resources enables frequent modifications of existing voice applications in a much improved and efficient manner than in the current art. However, when changing over from an existing configuration to a new configuration the running voice application is typically suspended from service while the changes are implemented. Shutting down service for even a temporary period can result in monetary loss that can be significant depending on the amount of time the system will be shut down. In some cases a backup system may be deployed while the primary system is being reconfigured. However this approach requires more resources that would be required to run one application.

What is clearly needed is a software routine or application for facilitating a one-click or single-action deployment and implementation of voice application system changes.

SUMMARY OF THE INVENTION

A system for configuring and implementing changes to a voice application system has a first software component and host node for configuring one or more changes; a second software component and host node for receiving and implementing the configured change or changes, and a data network connecting the host nodes.

In a preferred embodiment a configured change-order resulting from the first software component and host node is deployed after configuration, deployment and execution thereof requiring only one action. In one embodiment, the configured changes include one or more of new voice prompts or voice prompt sequences for a voice application. In another embodiment, the configured changes include one or more of new code modules.

In one aspect of the invention, first host node is a computer workstation in the second host node is a voice system. In one embodiment, the voice system is an interactive voice response unit coupled to a telephony switch. In another aspect, the voice system is an interactive voice server connected to a data network.

In one embodiment, the data network is a local-area-network. In another embodiment, the data network is a wide-area-network. In still another embodiment the data network includes a local-area-network, the public-switched-telephone-network, and the Internet network.

In a preferred embodiment, the changes are implemented to a voice application of the voice system, the application in a current state of running.

According to another aspect of the invention, a software application for implementing a change-order to a voice application system is provided. The application, in a preferred embodiment, includes a first portion thereof for receiving, scheduling, and task loading the change-order; a second portion thereof for locating and acquiring state of the voice application system component identified in the change-order; and a third portion thereof for executing and managing implementation of the change-order and reporting status results.

In a preferred embodiment the application is installed in the voice application system. In one embodiment the software application is installed in a dedicated host having a data connection to the voice application system. In one embodiment the data connection is established over a network comprising one or a combination of a local-area-network and a wide-area-network. In one embodiment, the voice application system component is a voice application and the change-order includes one or a combination of new voice prompts and new voice-prompt sequences. In this embodiment, the change-order is implemented to a voice application, which is in the current state of run.

In a preferred method the third portion thereof establishes orphan nodes representing portions of application dialog to be changed while the application is running. In this implementation, the established orphan nodes continue to function in the configuration until they are purged, the associated change-order components then functioning in the configuration.

In yet another aspect of the present invention, a method for implementing a change-order in a running voice application is provided and includes, (a) receiving a change-order for implementation; (b) loading the change-order for execution; (c) locating the voice application subject to the change-order; (d) establishing orphans representing portions of the application to be changed; (e) installing the change-order components while maintaining functionality of the orphan nodes; and (f) purging the functioning orphan nodes from the application when they are no longer required.

The method of claim 19 wherein in step (a) the actual files of the change-order configuration are received into a cache memory of a voice system hosting the application. In a preferred embodiment, in (a) the change-order is in the form of an object model tree. Alternatively, in step (a) the change-order is in the form of a bitmap image.

In one aspect of the method, the actual files associated with the change-order are pre-loaded separately from the change-order into a permanent or semi-permanent storage system, storage system also containing the original files of the application to be changed. Also in one embodiment, in step (c), the voice application located is in a state of run.

In a preferred aspect, in step (d) the orphans are portions of the voice application that will be replaced, deleted or modified. In this aspect the orphans are established from the root node of the voice application and progress down the application tree. Also in this aspect in step (e) the change-order components are installed from the bottom of the application tree in progression toward the root node of the application. In all aspects in step (f) the orphans are purged when there are no current callers interacting with them.

BRIEF DESCRIPTION OF THE DRAWING FIGURES

DESCRIPTION OF THE PREFERRED EMBODIMENTS

The inventor provides a system for managing voice prompts in a voice application system. Detail about methods, apparatus and the system as a whole are described in enabling detail below.

Figure 1:
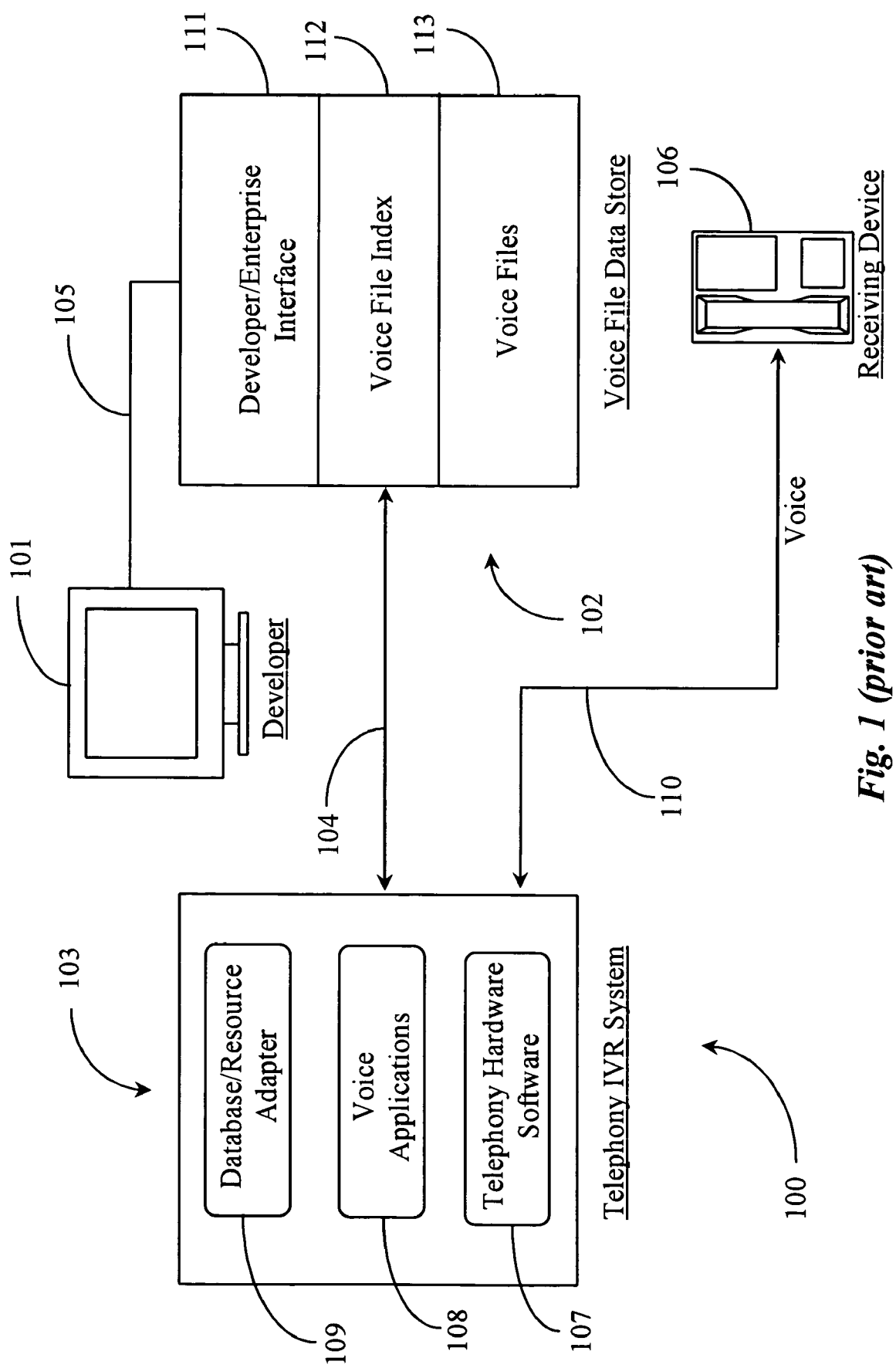
FIG. 1 is a logical overview of a voice interaction server and voice prompt data store according to prior-art.
Figure 2:
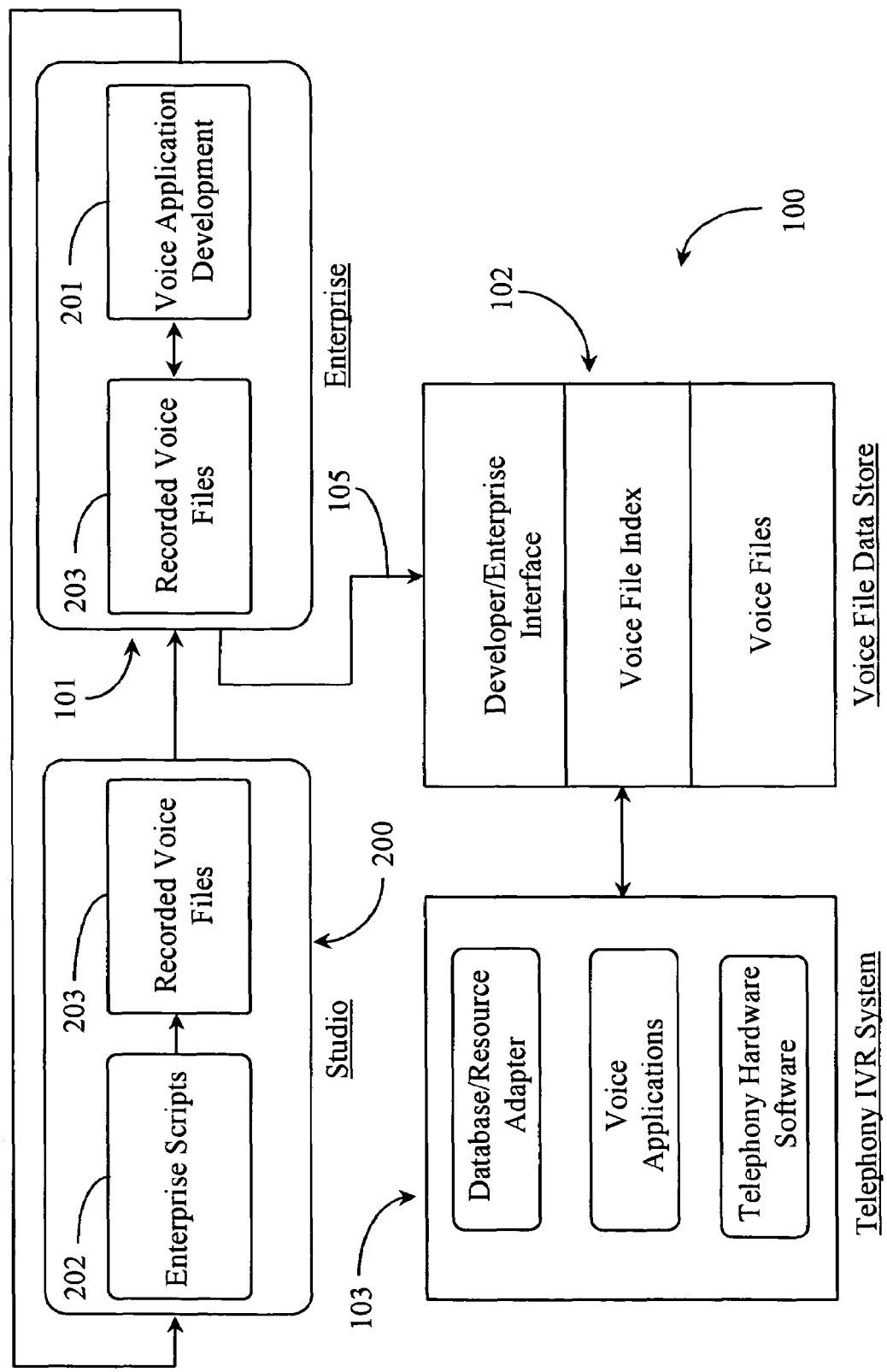
FIG. 2 is a block diagram illustrating voice prompt development and linking to a voice prompt application according to prior art.

FIG. 1 is a logical overview of a voice interaction server and voice prompt data store according to prior art. FIG. 2 is a block diagram illustrating voice prompt development and linking to a voice prompt application according to prior art. A voice application system 100 includes a developer 101, a voice file storage medium 102, a voice portal (telephony, IVR) 103, and one of possibly hundreds or thousands of receiving devices 106.

Device 106 may be a LAN-line telephone, a cellular wireless, or any other communication device that supports voice and text communication over a network. In this example, device 106 is a plane old telephone service (POTS) telephone.

Device 106 has access through a typical telephone service network, represented herein by a voice link 110, to a voice system 103, which in this example is a standard telephony IVR system. IVR system 103 is the customer access point for callers (device 106) to any enterprise hosting or leasing the system.

IVR 103 has a database/resource adapter 109 for enabling access to off-system data. IVR also has voice applications 108 accessible therein and adapted to provide customer interaction and call flow management. Applications 108 include the capabilities of prompting a customer, taking input from a customer and playing prompts back to the customer depending on the input received.

Telephony hardware and software 107 includes the hardware and software that may be necessary for customer connection and management of call control protocols. IVR 103 may be a telephony switch enhanced as a customer interface by applications 108. Voice prompts executed within system 103 may include only prerecorded prompts. A DNT equivalent may use both prerecorded prompts and XML-based scripts that are interpreted by a text-to-speech engine and played using a sampled voice.

IVR system 103 has access to a voice file data store 102 via a data link 104, which may be a high-speed fiber optics link or another suitable data carrier many of which are known and available. Data store 102 is adapted to contain prerecorded voice files, sometimes referred to as prompts. Prompts are maintained, in this example, in a section 113 of data store 102 adapted for the purpose of storing them. A voice file index 112 is illustrated and provides a means for searching store section 113 to access files for transmission over link 104 to IVR system 103 to be played by one of applications 108 during interaction with a client.

In this case IVR system 102 is a distributed system such as to a telephony switch location in a public switched telephone network (PSTN) and therefore is not equipped to store many voice files, which take up considerable storage space if they are high quality recordings.

Data store 111 has a developer/enterprise interface 111 for enabling developers such as developer 101 access for revising existing voice files and storing new and deleting old voice files from the data store. Developer 101 may create voice applications and link stored voice files to the application code for each voice application created and deployed. Typically, the voice files themselves are created in a separate studio from script provided by the developer.

As was described with reference to the background section, for a large enterprise there may be many thousands of individual voice prompts, many of which are linked together in segmented prompts or prompts that are played in a voice application wherein the prompts contain more than one separate voice file. Manually linking the original files to the application code when creating the application provides enormous room for human error. Although the applications are typically tested before deployment, errors may still get through causing monetary loss at the point of customer interface.

Another point of human management is between the studio and the developer. The studio has to manage the files and present them to the developer in a fashion that the developer can manipulate in an organized fashion. As the number of individual prerecorded files increases, so does the complexity of managing those prerecorded files.

Referring now to FIG. 2, developer 101 engages in voice application development activity 201. Typically voice files are recorded from script. Therefore, for a particular application developer 101 creates enterprise scripts 202 and sends them out to a studio (200) to be recorded. An operator within studio 200 receives scripts 202 and creates recorded voice files 203. Typically, the files are single segments, some of which may be strategically linked together in a voice application to play as a single voice prompt to a client as part of a dialog executed from the point of IVR 103, for example.

The enterprise must insure that voice files 203 are all current and correct and that the parent application has all of the appropriate lining in the appropriate junctions so that the files may be called up correctly during execution. Developer 101 uploads files 203 when complete to data store 102 and the related application may also be uploaded to data store 102. When a specific application needs to be run at a customer interface, it may be distributed without the voice files to the point of interface, in this case IVR 103. There may be many separate applications or sub-dialogs that use the same individual voice files. Often there will be many instances of the same voice file stored in data store 102 but linked to separate applications that use the same prompt in some sequence.

Figure 3:
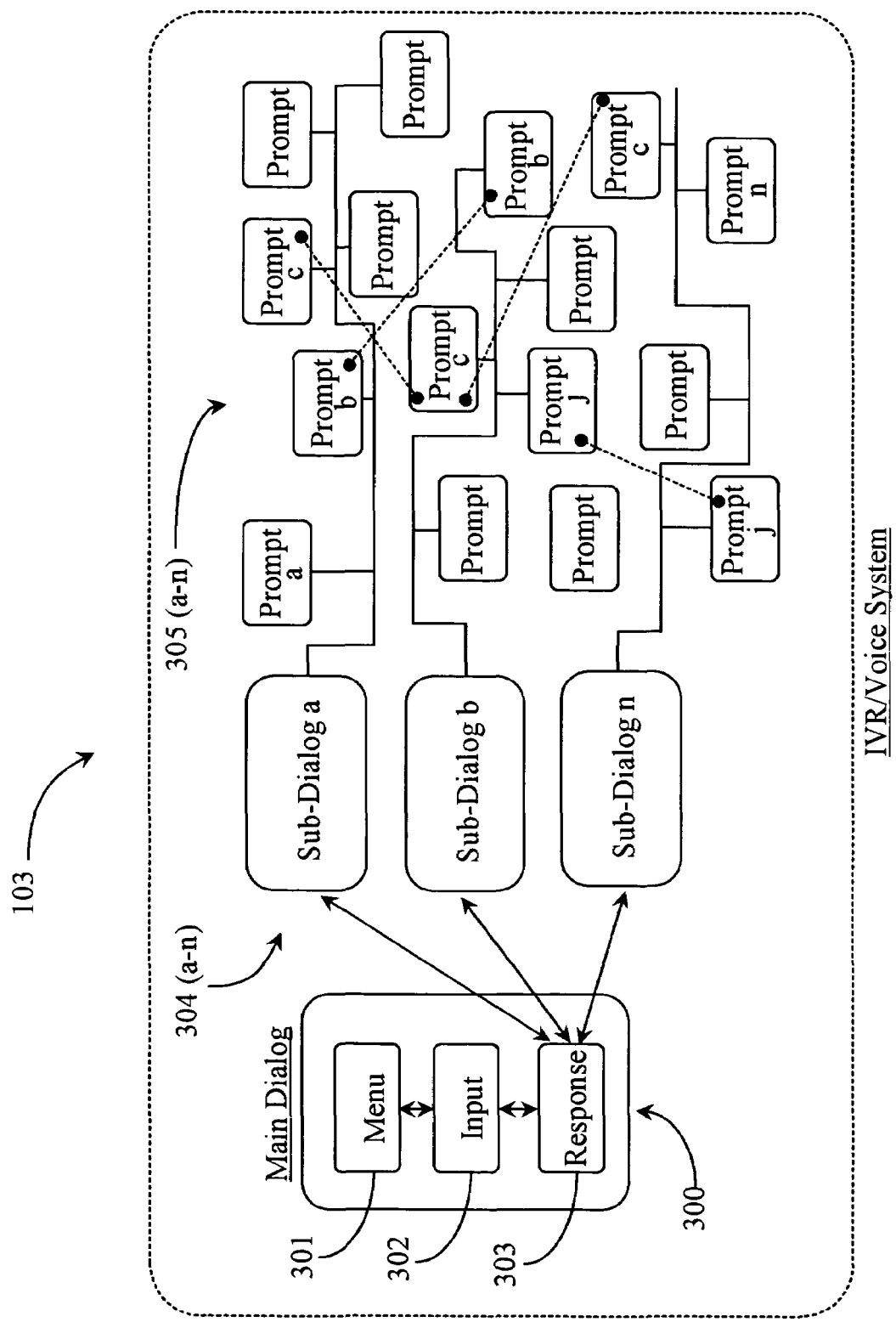
FIG. 3 is a block diagram illustrating a voice prompt development and management system according to an embodiment of the present invention.

FIG. 3 is an expanded view of IVR 103 of FIG. 2 illustrating a main dialog and sub-dialogs of a voice application according to prior art. In many systems, a main dialog 300 includes a static interactive menu 301 that is executed as part of the application logic for every client that calls in. During playing of menu 300, a client may provide input 302, typically in the form of voice for systems equipped with voice recognition technology. A system response 303 is played according to input 302.

System response 303 may include as options, sub-dialogs 304(a–n). Sub-dialogs 304(a–n) may link any number of prompts, or voice files 305(a–n) illustrated logically herein for each illustrated sub-dialog. In this case prompt 305b is used in sub-dialog 304a and in sub-dialog 304b. Prompt 305c is used in all three sub-dialogs illustrated. Prompt 305a is used in sub-dialog 304b and in sub-dialog 304b. Prompts are created at the time of application creation and deployment. Therefore prompts 305b, c, and j are stored in separate versions and locations for each voice application.

Figure 4:
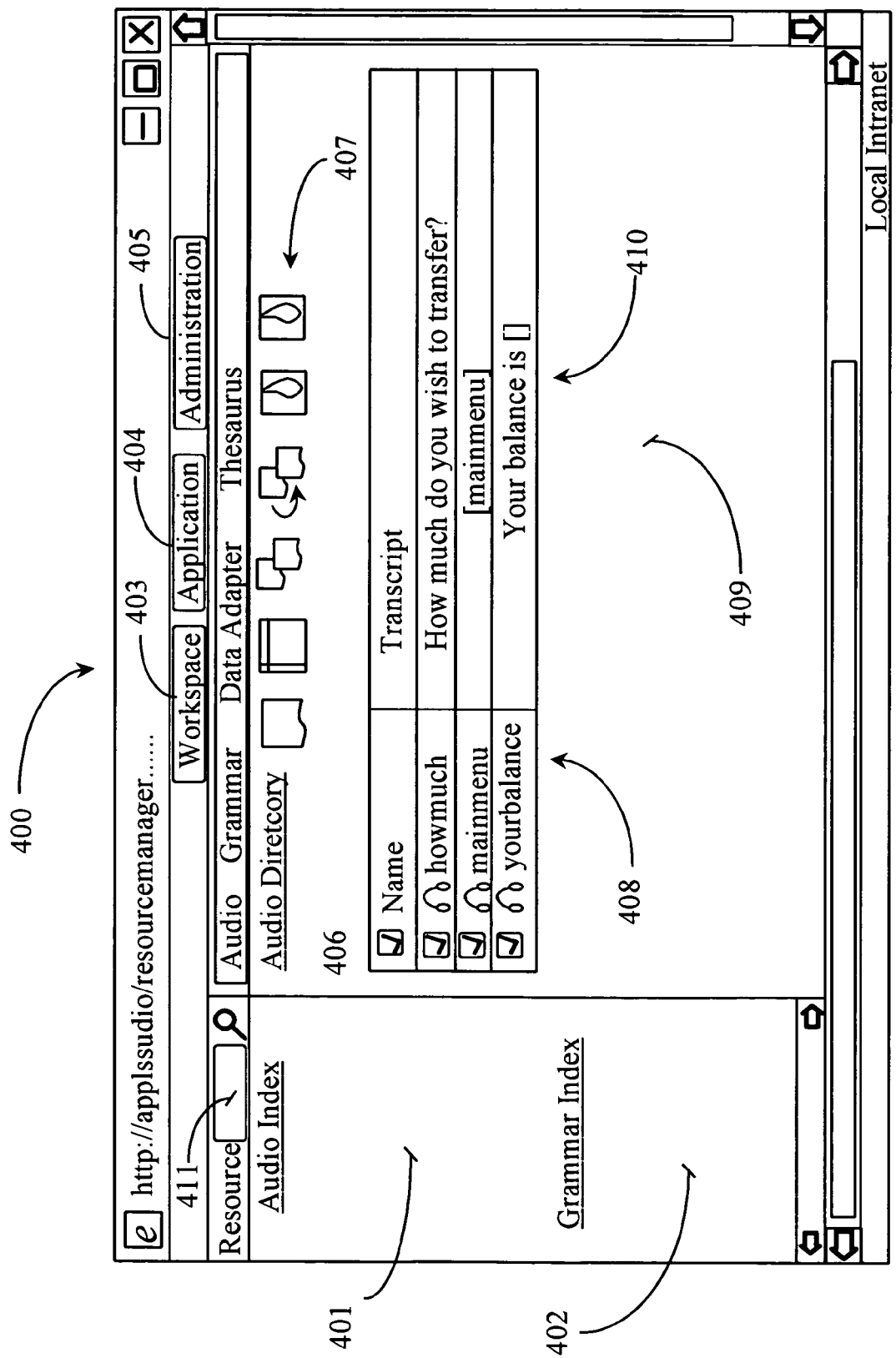
FIG. 4 illustrates an interactive screen for a voice application resource management application according to an embodiment of the present invention.

FIG. 4 illustrates an interactive screen 400 for a voice application resource management application according to an embodiment of the present invention. Screen 400 is a GUI portion of a software application that enables a developer to create and manage resources used in voice applications. Resources include both audio resources and application scripts that may be voice synthesized. For the purpose of this example, the inventor focuses on management of audio resources, which in this case, include voice file or prompt management in the context of one or more voice file applications.

Screen 400 takes the form of a Web browser type interface and can be used to access remote resources over a local area network (LAN), wide area network (WAN), or a metropolitan area network (MAN). In this example, a developer operating through screen 400 is accessing a local Intranet.

Screen 400 has a toolbar link 403 that is labeled workspace. Link 403 is adapted to open, upon invocation, a second window or changes the primary window to provide an area for working and audio management and creation tools for creating and working with audio files and transcripts or scripts.

Screen 400 has a toolbar link 404 that is labeled application. Link 404 is adapted to open, upon invocation, a second window or changes the primary window to provide an area for displaying and working with voice application code and provides audio resource linking capability. Screen 400 also has a toolbar link for enabling an administration view of all activity.

Screen 400 has additional toolbar links 406 adapted for navigating to different windows generally defined by label. Reading from left to right in toolbar options 406, there is Audio, Grammar, Data Adapter, and Thesaurus. The option Audio enables a user to view all audio-related resources. The option Grammar enables a user to view all grammar-related resources. The option Data Adapter enables a user to view all of the available adapters used with data sources, including adapters that might exist between disparate data formats. The option Thesaurus is self-descriptive.

In this example, a developer has accessed the audio resource view, which provides in window 409 an interactive data list 411 of existing audio resources currently available in the system. List 411 is divided into two columns a column 408 labeled "name" and a column 410 labeled "transcript". In this example there are three illustrated audio prompts reading from top to bottom from list 411 column 408 they are "howmuch", "mainmenu", and "yourbalance". An audio speaker icon next to each list item indicates the item is an audio resource and enable a developer to. Each audio resource is associated with the appropriate transcript of the resource as illustrated in column 410. Reading from top to bottom in column 410 for the audio resource "howmuch" the transcript is "How much do you wish to transfer?". For "mainmenu", the transcript is longer, therefore it in not reproduced in the illustration but may be assumed to be provided in full text. A scroll function may be provided to scroll a long transcript associated with an audio resource. For the audio resource "yourbalance", the transcript is "Your balance is [ ]. The brackets enclose a variable used in a voice system prompt response to a client input interpreted by the system.

In one embodiment there may be additional options for viewing list 411, for example, separate views of directory 411 may be provided in different languages. In one embodiment, separate views of directory 411 may be provided for the same resources recorded using different voice talents. In the case of voice files that are contextually the same, but are recorded using different voice talents and or languages, those files may be stored together and versioned according to language and talent.

Window 409 can be scrollable to reach any audio resources not viewable in the immediate screen area. Likewise, in some embodiments a left-side navigation window may be provided that contains both audio resource and grammar resource indexes 401 and 402 respectively to enable quick navigation through the lists. A resource search function 411 is also provided in this example to enable keyword searching of audio and grammar resources.

Screen 400 has operational connectivity to a data store or stores used to where house the audio and grammar resources and, in some cases, the complete voice applications. Management actions initiated through the interface are applied automatically to the resources and voice applications.

A set of icons 407 defines additional interactive options for initiating immediate actions or views. For example, accounting from left to right a first icon enables creation of a new audio resource from a written script. Invocation of this icon brings up audio recording and editing tools that can be used to create new audio voice files and that can be used to edit or version existing audio voice files. A second icon is a recycle bin for deleting audio resources. A third icon in grouping 407 enables an audio resource to be copied. A fourth icon in grouping 407 enables a developer to view a dependency tree illustrating if where and when the audio file is used in one or more voice dialogs. The remaining two icons are upload and download icons enabling the movement of audio resources from local to remote and from remote to local storage devices.

In one embodiment of the present invention, the functions of creating voice files and linking them to voice applications can be coordinated through interface 400 by enabling an author of voice files password protected local or remote access for downloading enterprise scripts and for uploading new voice files to the enterprise voice file database. By marking audio resources in list 410 and invoking the icon 407 adapted to view audio resource dependencies, an operator calls up a next screen illustrating more detail about the resources and further options for editing and management as will be described below.

Screen 400, in this example, has and audio index display area 401 and a grammar display index area 402 strategically located in a left scrollable sub-window of screen 400; As detailed information is viewed for a resource in window 409, the same resource may be highlighted in the associated index 401 or 402 depending on the type of resource listed.

Figure 5:
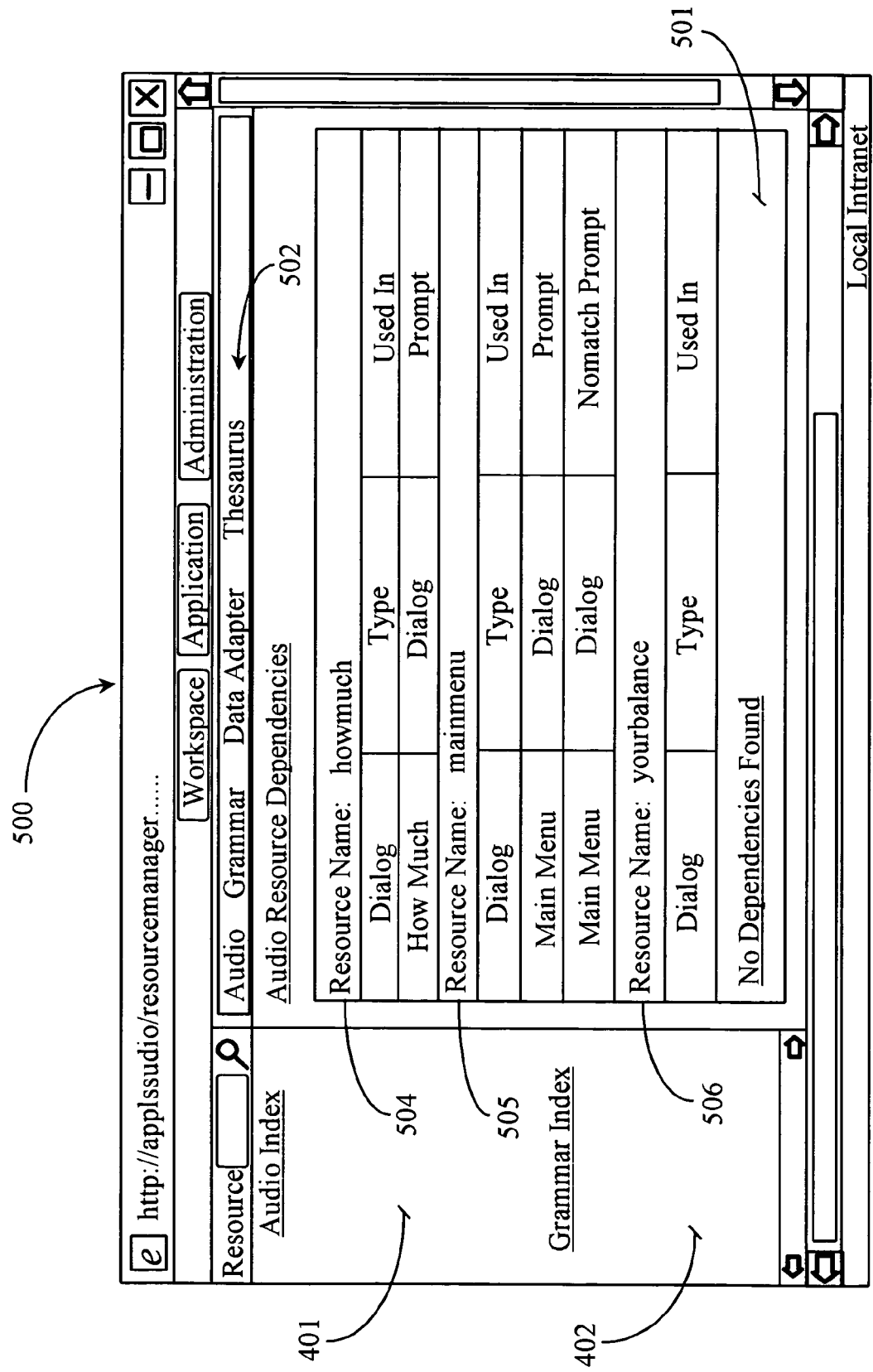
FIG. 5 illustrates an interactive screen having audio resource details and dependencies according to an embodiment of the present invention.

FIG. 5 is illustrates an interactive screen 500 showing audio resource details and dependencies according to an embodiment of the present invention. Screen 500 has a scrollable main window 501 that is adapted to display further details about audio resources previously selected for view. Previous options 406 remain displayed in screen 500. In this example each resource selected in screen 400 is displayed in list form. In this view audio resource 504 has a resource name "howmuch". The resource 504 is categorized according to Dialog, Dialog type, and where the resource is used in existing voice applications. In the case of resource 504, the dialog reference is "How Much", the resource type is a dialog, and the resource is used in a specified dialog prompt. Only one dependency is listed for audio resource 504, however all dependencies (if more than one) will be listed.

Resource 505, "mainmenu" has dependency to two main menus associated with dialogs. In the first listing the resource is used in a standard prompt used in the first listed dialog of the first listed main menu. In the second row it is illustrated that the same audio resource also is used in a nomatch prompt used in a specified dialog associated with the second listed main menu. For the purpose of this specification a nomatch prompt is one where the system does not have to match any data provided in a response to the prompt. A noinput prompt is one where no input is solicited by the prompt. It is noted herein that for a general application prompt definitions may vary widely according to voice application protocols and constructs used. The dependencies listed for resource 505 may be associated with entirely different voice applications used by the same enterprise. They may also reflect dependency of the resource to two separate menus and dialogs of a same voice application.

No specific ID information is illustrated in this example, but may be assumed to be present. For example, there may be rows and columns added for displaying a URL or URI path to the instance of the resource identified. Project Name, Project ID, Project Date, Recording Status (new vs. recorded), Voice Talent, and Audio Format are just some of the detailed information that may be made available in window 501. There may be a row or column added for provision of a general description of the resource including size, file format type, general content, and so on.

Resource 506, "yourbalance" is listed with no dependencies found for the resource. This may be because it is a newly uploaded resource that has not yet been linked to voice application code. It may be that it is a discarded resource that is still physically maintained in a database for possible future use. The lack of information tells the operator that the resource is currently not being used anywhere in the system.

Screen 500, in this example, has audio index display area 401 and a grammar display index area 402 strategically located in a left scrollable sub-window of screen 500 as described with reference to screen 400 of FIG. 4 above. As detailed information is viewed for a resource in window 501, the same resource may be highlighted in the associated index 401 or 402 depending on the type of resource listed.

Figure 6:
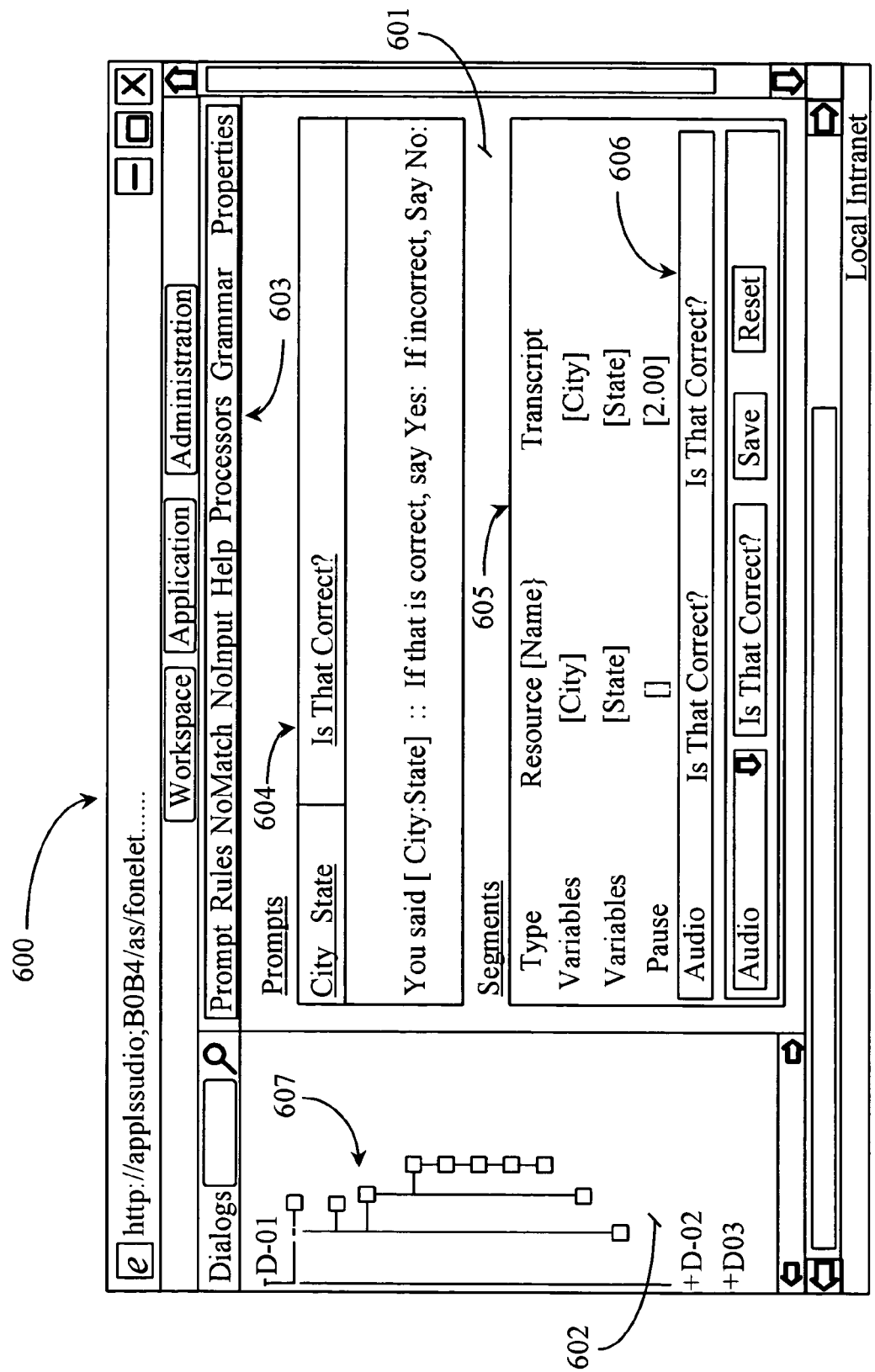
FIG. 6 illustrates an interactive screen for an audio resource manager illustrating further details and options for editing and management according to an embodiment of the present invention.

FIG. 6 illustrates an interactive screen 600 of an audio resource manager illustrating further details and options for editing and management according to an embodiment of the present invention. Screen 600 enables a developer to edit existing voice files and to create new voice files. A dialog tree window 602 is provided and is adapted to list all of the existing prompts and voice files linked to dialogs in voice applications. The information is, in a preferred embodiment, navigable using a convenient directory and file system format. Any voice prompt or audio resource displayed in the main window 601 is highlighted in the tree of window 602.

In one embodiment of the present invention from screen 500 described above, a developer can download a batch of audio resources (files) from a studio remotely, or from local storage and can link those into an existing dialog, or can create a new dialog using the new files. The process, in a preferred embodiment, leverages an existing database program such as MS Excel™ for versioning and keeping track of voice prompts dialogs, sub-dialogs, and other options executed during voice interaction.

In one embodiment of the present invention a developer can navigate using the mapping feature through all of the voice application dialogs referencing any selected voice files. In a variation of this embodiment the dialogs can be presented in descending or ascending orders according to some criteria specified like date, number of use positions, or some other hierarchical specification. In still another embodiment, a developer accessing an audio resource may also have access to any associated reference files like coaching notes, contextual notes, voice talent preferences, language preferences, and pronunciation nuances for different regions.

In a preferred embodiment, using the software of the present invention multiple links do not have to be created to replace an audio resource used in multiple dialog prompts of one or more voice applications. For example, after modifying a single voice file, one click may cause the link to the stored resource to be updated across all instances of the file in all existing applications. In another embodiment where multiple storage sites are used, replication may be ordered such that the modified file is automatically replicated to all of the appropriate storage sites for local access. In this case, the resource linking is updated to each voice application using the file according to the replication location for that application.

Screen 600 illustrates a prompt 604 being developed or modified. The prompt in this example is named "Is that correct?" and has variable input fields of City and State. The prompt 604 combines audio files to recite "You said [City: State]:: If that is correct, say Yes: If in correct, Say No: The prompt may be used in more than one dialog in more than one voice application. The prompt may incorporate more than one individual prerecorded voice file.

A window 605 contains segment information associated with the prompt "Is that correct?" such as the variable City and State and the optional transcripts (actual transcripts of voice files). New voice files and transcripts describing new cities and states may be added and automatically liked to all of the appropriate prompt segments used in all dialogs and applications.

Typically, audio voice files of a same content definition, but prerecorded in one or more different languages and/or voice talents will be stored as separate versions of the file. However, automated voice translation utilities can be used to translate an English voice file into a Spanish voice file, for example, on the fly as the file is being accessed and utilized in an application. Therefore, in a more advanced embodiment multiple physical prerecorded voice files do not have to be maintained.

Screen 600 has a set of options 603 for viewing creating or editing prompts, rules, nomatch prompts, and no-input prompts. Options for help, viewing processor details, help with grammar, and properties are also provided within option set 603. Workspace provides input screen or windows for adding new material and changes. The workspace windows can be in the form of an excel worksheet as previously described.

In one embodiment of the present invention linking voice files to prompts in application can be managed across multiple servers in a distributed network environment. Voice files, associated transcripts, prompt positions, dialog positions, and application associations are all automatically applied for the editor eliminating prior-art practice of re-linking the new resources in the application code. Other options not illustrated in this example may also be provided without departing from the spirit and scope of the present invention. For example, when a voice file used in several places has been modified, the editor may not want the exact version to be automatically placed in all use instances. In this case, the previous file is retained and the editor simply calls up a list of the use positions and selects only the positions that the new file applies to. The system then applies the new linking for only the selected prompts and dialogs. The old file retains the linking to the appropriate instances where no modification was required.

In another embodiment, voice file replication across distributed storage systems is automated for multiple distributed IVR systems or VXML portals. For example, if a developer makes changes to voice files in one storage facility and links those changes to all known instances of their use at other client access points, which may be widely distributed, then the distributed instances may automatically order replication of the appropriate audio resources from the first storage facility to all of the other required storage areas. Therefore, for voice applications that are maintained at local client-access facilities of a large enterprise that rely on local storage of prerecorded files can, after receiving notification of voice file linking to a new file or files can execute and order to retrieve those files from the original storage location and deposit them into their local stores for immediate access. The linking then is used as a road map to insure that all distributed sites using the same applications have access to all of the required files. In this embodiment audio resource editing can be performed at any network address wherein the changes can be automatically applied to all distributed facilities over a WAN.

Figure 7:
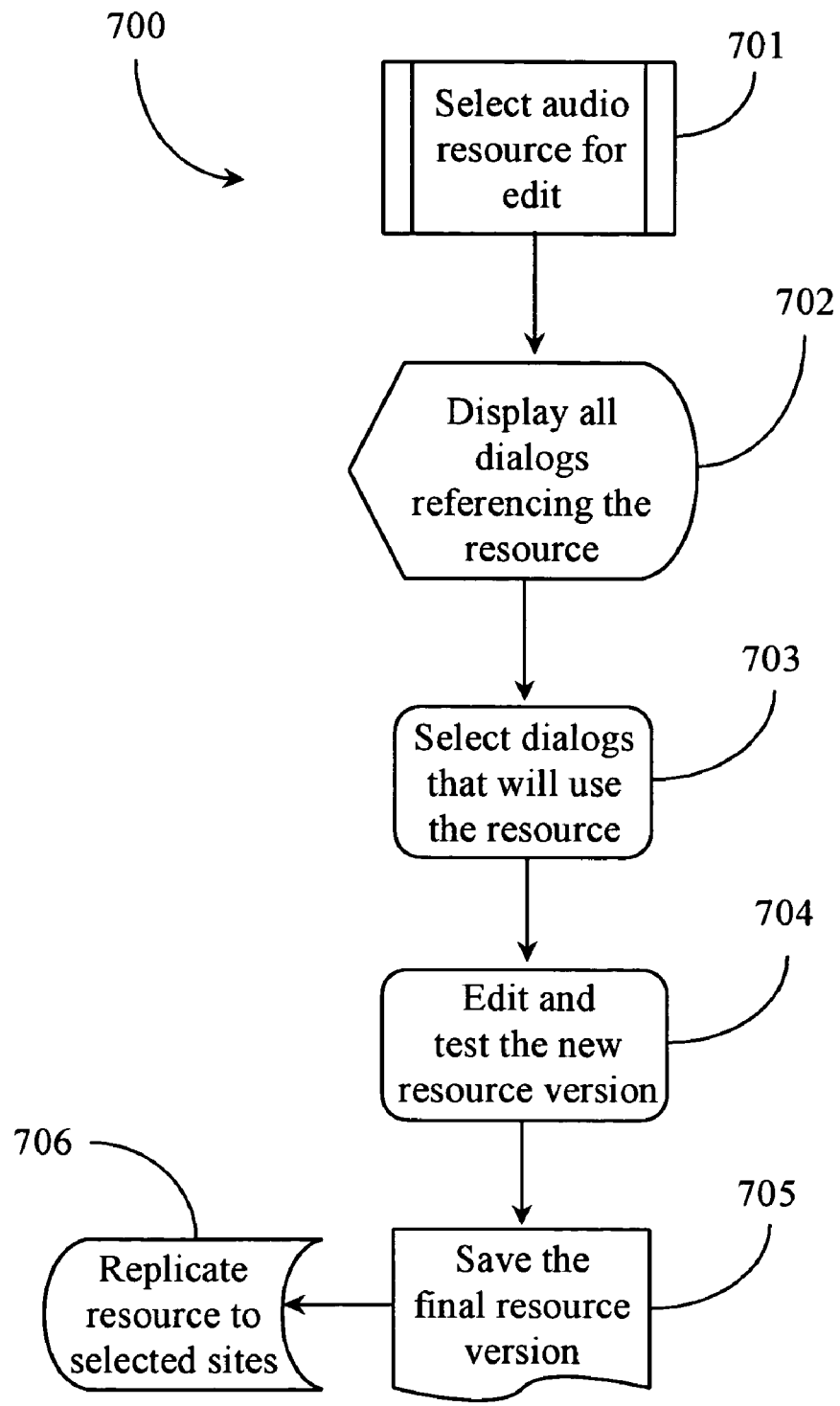
FIG. 7 is a process flow diagram illustrating steps for editing or replacing an existing audio resource and replicating the resource to distributed storage facilities.

FIG. 7 is a process flow diagram 700 illustrating steps for editing or replacing an existing audio resource and replicating the resource to distributed storage facilities. At step 701, the developer selects an audio resource for edit or replacement. The selection can be based on a search action for a specific audio resource or from navigation through a voice application dialog menu tree.

At step 702 all dialogs that reference the selected audio resource are displayed. At step 703, the developer may select the dialogs that will use the edited or replacement resource by marking or highlighting those listed dialogs. In one embodiment all dialogs may be selected. The exact number of dialogs selected will depend on the enterprise purpose of the edit or replacement.

At step 704, the developer edits and tests the new resource, or creates an entirely new replacement resource. At step 705, the developer saves the final tested version of the resource. At step 706, the version saved is automatically replicated to the appropriate storage locations referenced by the dialogs selected in step 703.

In this exemplary process, steps 702, and step 706 are automated results of the previous actions performed.

The methods and apparatus of the present invention can be applied on a local network using a central or distributed storage system as well as over a WAN using distributed or central storage. Management can be performed locally or remotely, such as by logging onto the Internet or an Intranet to access the software using password protection and/or other authentication procedures.

The methods and apparatus of the present invention greatly enhance and streamline voice application development and deployment and according to the embodiments described, can be applied over a variety of different network architectures including DNT and POTS implementations.

One-touch System Configuration Routine

According to one aspect of the present invention a software routine is provided that is capable of receiving a configuration package and of implementing the package at a point of voice interaction in order to effect system changes and voice application changes without suspending a system or application that is running and in the process of interaction with clients.

Figure 8:
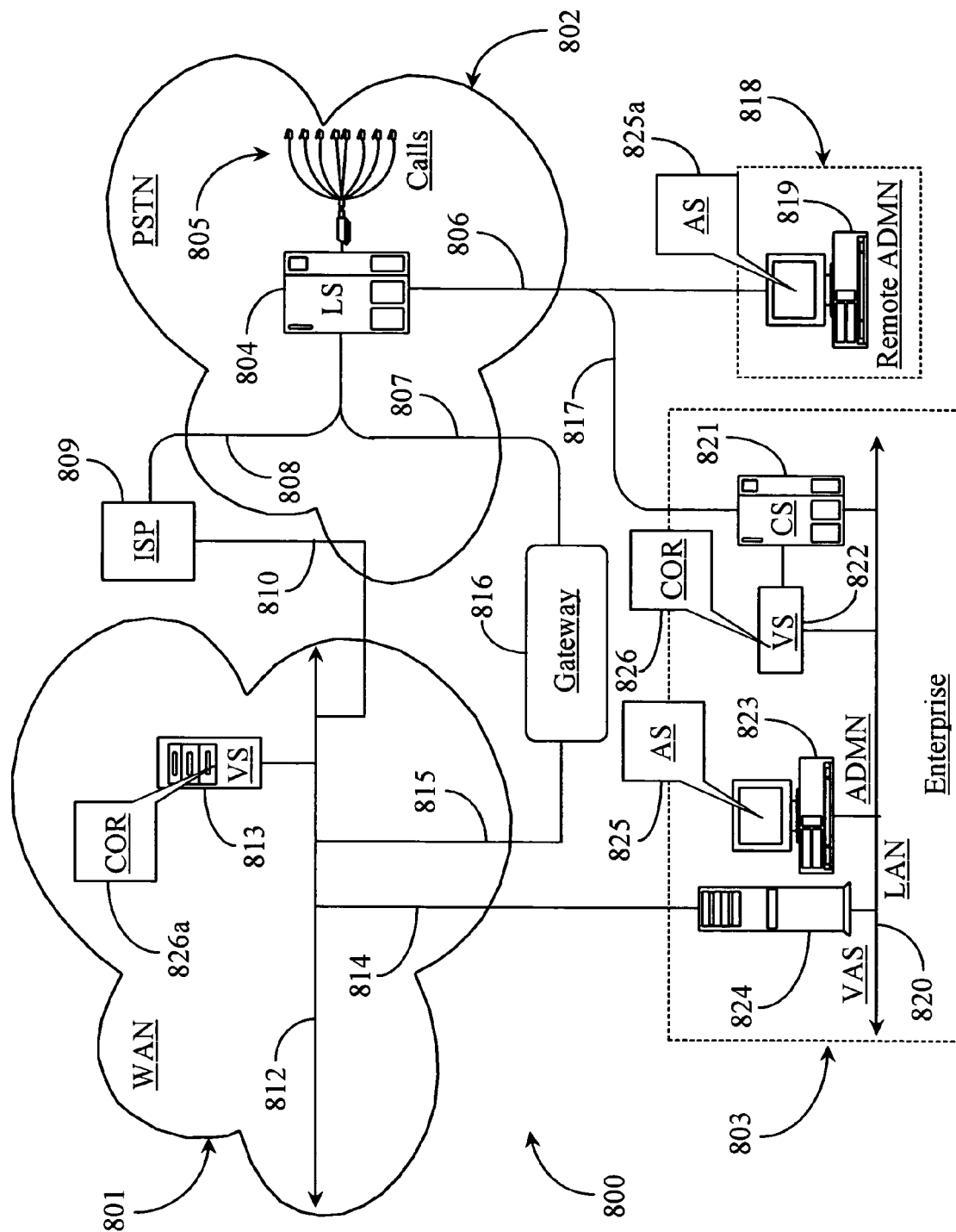
FIG. 8 is architectural overview of a communications network wherein automated voice application system configuration is practiced according to an embodiment of the present invention.

FIG. 8 is architectural overview of a communications network 800 wherein automated voice application system configuration is practiced according to an embodiment of the present invention. Communications network 800 encompasses a wide-area-network (WAN) 801, a public-switched-telephone-network (PSTN) 802, and a communications host illustrated herein as an enterprise 803.

Enterprise 803 may be any type of enterprise that provides services to clients, which are accessible to a call-in center or department. Enterprise 803, in this example, maintains voice interaction access points to voice services. Enterprise 803 may be assumed to contain a communications-center type environment wherein service agents interact with clients calling into the enterprise.

Enterprise 803 has a local-area-network (LAN) 820 provided therein and adapted for supporting a plurality of agent-operated workstations for communication and data sharing. LAN 820 has communications access to WAN 801 and to PSTN 802. A central telephony switch (CS) 821 is provided within enterprise 803 and is adapted to receive calls routed thereto from PSTN 802 via a telephony trunk branch 817 from a local switch in the network illustrated herein as switch (LS) 804. LS 804 may be a private-branch type of exchange (PBX), and automated-call-distributor (ACD), or any other type of telephone switch capable of running calls.

CS 821 has an interactive voice system peripheral (VS) 822 connected thereto by a CTI link. VS 822 also has connection to LAN 820. VS 822 is adapted to interact with callers routed CS 821 according to voice application dialogs therein. VS 822 may be an IVR system or a voice recognition system (VRS) without departing from the spirit and scope of the present invention. VS 822 is a point of deployment for voice applications used for client interaction. In this example, incoming calls routed to CS 821 from LS 800 from within PSTN 802 are illustrated as calls 805 incoming into LS 804 from anywhere within PSTN 805.

Enterprise 803 has a voice application server (VAS) 824 provided therein and connected to LAN 820. VAS 824 is adapted for storing and serving voice applications created by an administrator (ADMN) 823 represented herein by a computer icon also shown connected to LAN 820. Administrator 823 uses a client software application (AS) 825 to create voice applications and manage voice files, voice prompts, and voice dialogs of those applications.

Once applications are created they may be deployed by VAS 824 to VS 822 for immediate service. In one embodiment of the present invention, system 822 stores voice applications locally (storage not shown). In another embodiment of the present invention system 822 retrieves voice applications from system 824 over LAN 820 when those applications are required in interaction with clients. AS 825 installed on workstation 823 is analogous to an application described further above respect to screenshots 400, 500, and 600 of FIGS. 4, 5, and 6 respectively. One exception is that AS 825 is enhanced according to an embodiment of the present invention with a utility for enabling configuration and one touch deployment of voice application or system modification updates to voice applications or settings active at VS 822. In some embodiments of the present invention, updates created and deployed from workstation 823 are applied to voice applications while those applications are active in interaction without a requirement for shutting down or suspending those applications from service.

Voice application server 824, in this embodiment, has connection to WAN 801 via a WAN access line 814. WAN 801 may be the well-known Internet, an Intranet, or a corporate WAN, among other possibilities. LAN access line 814 may be a 24/7 connection or a connection through a network service provider. WAN 801 has a network backbone 812 extending there through, which represents all of the lines, equipment, and access points making up the entire WAN as a whole.

Backbone 812 has a voice system (VS) 813 connected thereto, which represents a data-network-telephony (DNT) version of VS 822. System 813 uses voice applications to interact with clients accessing the system from anywhere in WAN 801 or any connected sub networks. It is noted herein, that networks 802 and 801 are bridged to gather for communication via a gateway 816. Gateway 816 is adapted translating telephony protocols into data network protocols and in reverse order enabling, for example, IP telephony callers to place calls to PSTN destinations, and PSTN telephony callers to place calls to WAN destinations. In one embodiment, gateway 816 may be an SS-7 Bell core system, or some other like system. Therefore, it is possible for PSTN callers to access voice interaction provided by system 813 and for WAN callers to access voice interaction provided by system 822.

A remote administrator is illustrated in this example as a remote administrator 818. Administrator 818 may be operating from a remote office, from a home, or from any physical location providing telephone and network-access services. A personal computer icon representing a workstation 819 further defines administrator 818. Workstation 819 is analogous in this embodiment to workstation 823 except that it is a remote workstation and not LAN-connected in this example.

Workstation 819 has a software application 825a provided thereto, which is analogous to application 825 installed on workstation 823 within enterprise 803. Voice systems 822 and 813 have instances of a configuration order routine (COR), 826 for VS 822, and 826a for VS 813 installed thereon. COR (826, 826a) is adapted to except a configuration order package from AS 825 and/or AS 825a respectively. COR (826, 826a) excepts and implements configuration orders created by administrators 823 or 819 and automatically applies those configuration orders to their respective voice systems.

In a preferred embodiment of the present invention, administrator 823 utilizes application software 825 create necessary updates to existing voice applications including any required settings changes. Voice application server 824 contains the actual voice applications in this case, which may be served to voice system 822 when required. In one embodiment however, voice system 822 may store voice applications for immediate access. After making the required edits, administrator 823 may initiate a one-touch deployment action that causes a change-order to be implemented by change-order routine 826 running in VS 822. It is noted herein that a change-order for a voice application that is running may automatically extract and implement itself while the application is still running. A change-order may also be implemented to an application that is not currently running without departing from the spirit and scope of the present invention.

When VS 822 receives a change-order from administrator 823, application 826 executes and implements the change-order. In the case of a running application, there may be a plurality of callers queued for different dialog prompts or prompt sequences of the same application. In this case, COR 826 monitors the state of the running application and implements the changes so that they do not negatively affect caller interaction with the application. More detail about how this is accomplished is provided later in this specification.

Remote administrator 819 may also create and implement change-orders to applications running in voice system 822 from a remote location. For example, utilizing AS 825a, administrator 819 may connect to ISP 809 through LS 804 via trunk 806 and trunk branch 808. ISP 809 may then connect administrator 819 to backbone 812, from where VS 824 is accessible via network line 814. Administrator 819 may therefore perform any of the types of edits or changes to applications running in VS 822 or to any settings of VS 822 that administrator 823 could configure for the same. Moreover, administrators 823 and 819 may generate updates for any voice applications running on voice system 813 connected to backbone 812 in WAN 801.

Calls 805 may represent PSTN callers accessing CS 821 through trunk 806 and trunk branch 817. Calls 805 may also include callers operating computers accessing VS 813 through ISP 809 via trunk branch 808 and network line 810, or through gateway 816 via trunk branch 807 and network line 815. Although the architecture in this example illustrates tethered access, callers 805 may also represent wireless users.

Figure 9:
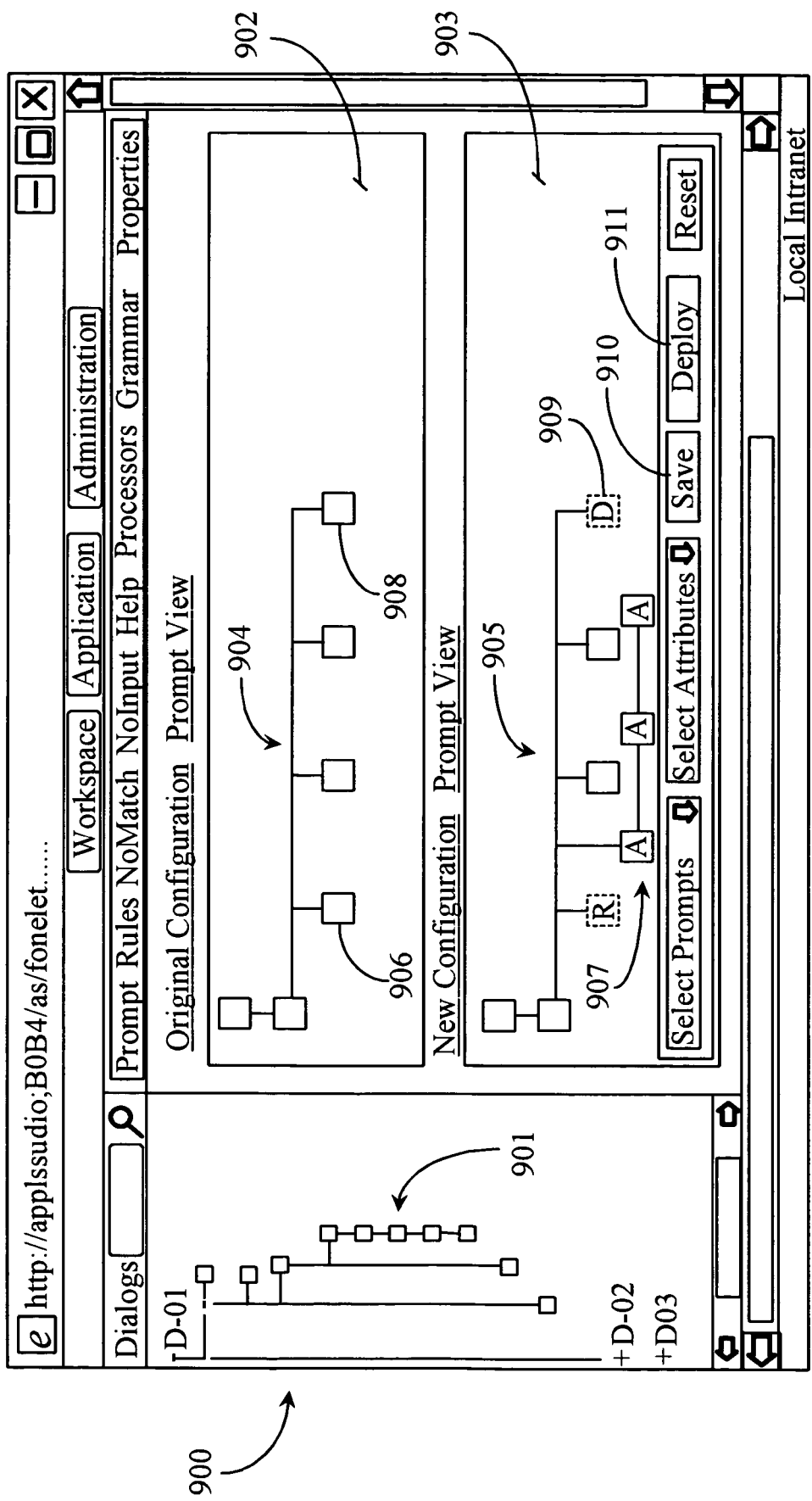
FIG. 9 is an exemplary screenshot illustrating application of modifications to a voice dialog according to an embodiment of the present invention.

FIG. 9 is an exemplary interactive screen 900 illustrating application of modifications to a voice dialog according to an embodiment of the present invention. Screen 900 illustrates capability for creating a change-order or update to voice application dialog in this example. Screen 900 is a functional part of AS 825 or 825a described above with reference to FIG. 8. Screenshot 900, in a preferred embodiment, stems from the same parent application hosting interactive screens 400, 500, and 600, described further above.

Interactive screen 900 contains a workspace 902, and a workspace 903. Space 902 contains a portion 904 of a dialog D-01 (logical representation only) illustrated in expanded view as a dialog 901, which is accessible from a dialog menu illustrated at far left of screen 900. A dialog search box is provided for locating any particular dialog that needs to be updated.

Within workspace 902, dialog portion 904 is illustrated in the form of an original configuration. In this example, a prompt 906 and a prompt 908 of dialog portion 904 will be affected by an update. Dialog portion 900 is illustrated within workspace 903 as an edited version 905. Workspace 903 is a new configuration workspace.

Prompt 906 in workspace 902 is to be replaced. In workspace 903, the affected prompt is illustrated as a dotted rectangle containing an R signifying replacement. In this example, prompt 906 is replaced with a prompt sequence 907. Sequence 907 contains three prompts labeled A signifying addition. Prompt 908 from workspace 902 is illustrated as a deleted prompt 909 in workspace 903 (dotted rectangle D).

The new configuration 905 can be "saved-to-file" by activating a save button 910, or can be saved and deployed by activating a deploy button 911. A reset button is also provided for resetting new configuration 905 to the form of the original the configuration 904. Interactive options for selecting prompts and for selecting attributes are provided for locating the appropriate new files link to the dialog. Each workspace 902 and 903 has a prompt-view option enabling an administrator to select any prompt in the tree and expand that prompt for play-back purposes or for viewing transcripts, author data, and so on.

When an original configuration has been updated to reflect a new configuration, selecting the deploy option 911 causes the update package to be deployed to the appropriate VS system (if stored therein) or to the VAS if the application is executed from such a server. The exact point of access for any voice system will depend on the purpose and design of the system. For example, referring back to FIG. 8, if a voice system and switch are provided locally within an enterprise, then the actual voice applications may be served to clients through the voice system, the application hosted on a separate machine, but called in to service when needed. In one embodiment, VS 824 distributes the voice applications to the respective interaction points or hosts, especially if the interaction host machine is remote.

Figure 10:
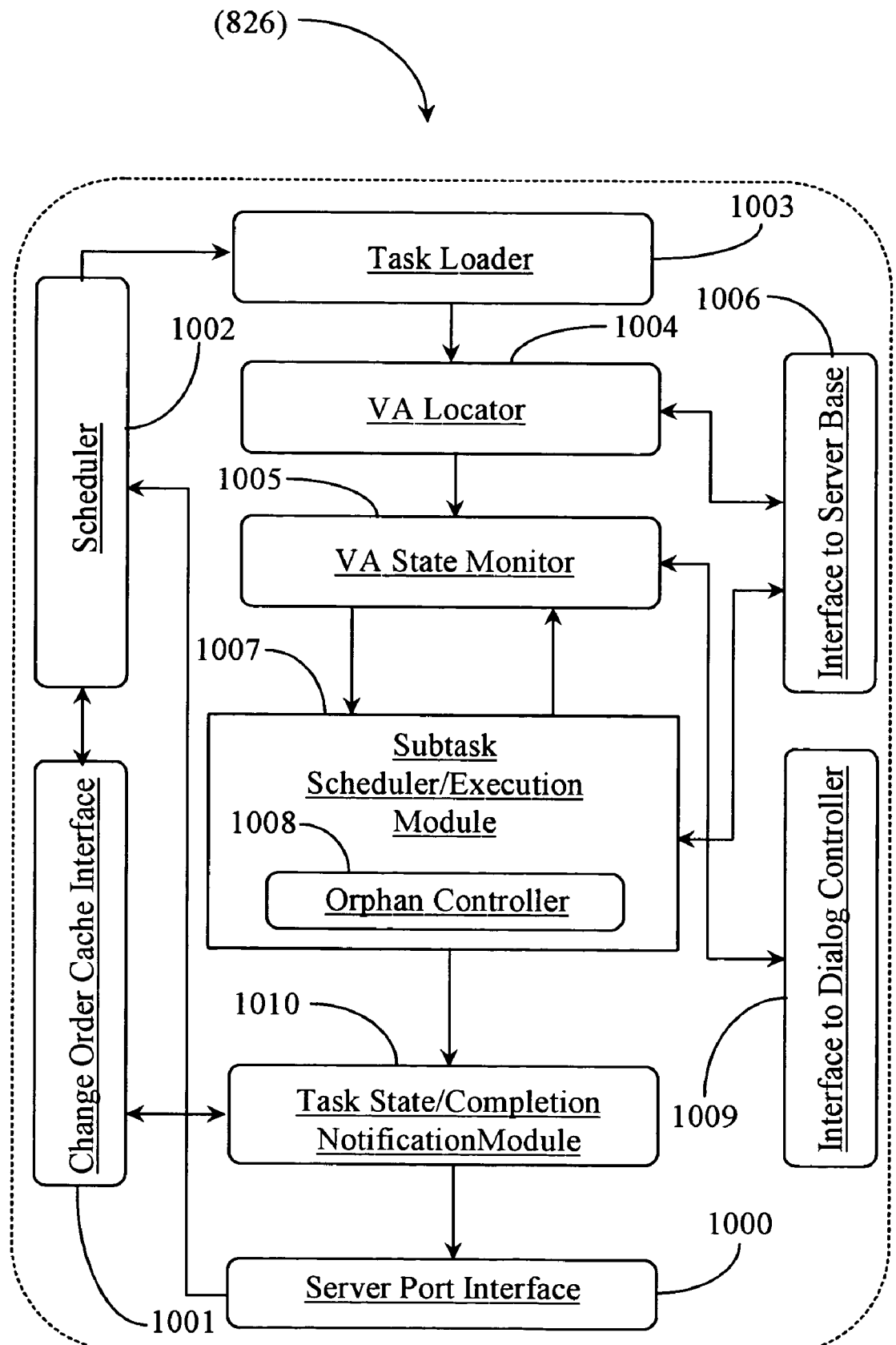
FIG. 10 is a block diagram illustrating components of an automated voice application configuration application according to an embodiment of the present invention.

FIG. 10 is a block diagram illustrating components of automated voice application configuration routine (826, 826a) according to an embodiment of the present invention. Application 826 contains several components that enable automated configuration of updates or edits to voice applications that may be in the process of assisting clients.

Application 826 has a server port interface 1000 adapted to enable the application to detect when a change-order or update has arrived at the voice system. A host machine running application 826, in a preferred embodiment, will have a cache memory or data queue adapted to contain incoming updates to voice applications, some of which may be running when the updates have arrived.

Application 826 has a scheduler component provided therein and adapted to receive change-orders from a cache memory and schedule those change-orders for task loading.

It is noted herein that a change-order may have its own schedule for task loading. In this case scheduler 1002 parses the schedule of the change-order and will not load the order until the correct time has arrived. Application 826 has a task loader 1003 provided therein and adapted to accept change-orders from scheduler 1002 for immediate implementation.

In one embodiment of the present invention, application 826 receives change-orders that include both instructions and the actual files required to complete the edits. In another embodiment of the present invention application 826 receives only the instructions, perhaps in the form of an object map or bitmap image, wherein the actual files are preloaded in identifiable fashion into a database containing the original files of the voice application or voice system settings. For updating voice applications, the actual implementation will depend on whether the voice files used to update the application are stored locally (within the VS) or are accessed from a separate machine such as a VAS.

Application 826 has a voice application (VA) locator 1004 provided therein, and adapted to find, in the case of voice application update, the correct application that will be updated. It is possible that the application being updated is not in use currently. It is also possible that the application being updated is currently in use. In either instance, VA locator 1004 is responsible for finding the location of the application and its base files.

VA locator 1004 has connection to a database or server base interface 1006 provided therein and adapted to enable VA locator 1004 to communicate externally from the host system or VS. Therefore, if a particular voice application is being stored on a voice application server separate from voice system that uses the interaction, the voice application locator running on the voice system can locate correct application on the external machine.

Application 826 has a voice application (VA) state monitor 1005 provided therein and adapted to monitor state of any voice application identified by VA locator 1004 that is currently running and serving clients during the time of update. State monitor 1005 has connection to a dialog controller interface 1009. A dialog controller is used by the voice system to execute a voice application. The dialog controller manages the caller access and dialog flow of any voice application in use by the system and therefore has state information regarding the number of clients interacting with the application and their positions in the dialog hierarchy.

Application 826 has a sub-task scheduler/execution module 1007 provided therein, and adapted to execute a change-order task according to instructions provided by VA state monitor 1005. Module 1007 contains an orphan controller 1008. Orphan controller 1008 is adapted to maintain a functioning state in a voice application of certain prompts or prompt sequences that are to be deleted or replaced with new files used by a new configuration.

It is important that the current client load using the voice application under modification is not inconvenienced in any way during the flow of the application and that clients traversing a new dialog will have the prompts in place so that the application does not crash. For this reason, orphans are maintained from the top down while changes to the application are built from the bottom up. In one embodiment of the present invention a new configuration is an object tree wherein the objects are prompts and prompt sequences. Similarly, the voice application that is to be modified has a similar object tree. The objects or nodes are links to the actual files that are applied in voice interaction. Likewise, there are objects or nodes in a voice application tree that represent functional code responsible for the direction of the application determined according to user response.

Module 1007 cooperates with VA state monitor 1005 to perform a change-order to a voice application using orphan controller 1008 to maintain functional orphans until all of the new objects are in place and callers are cleared from the orphan tree. In actual practice, the voice application being modified continues to function as a backup application while it is being modified. Replacement files and code modules associated with the change-order are, in a preferred embodiment, available in a same data store and memory partition that the original application files and code reside having been loaded therein either from cache or directly. In one embodiment, the files representing changes may be pre-loaded into the same storage hosting the old files such that as change-order is implemented by application 826 the change files are caused to take the place of the original files as required. The subtask scheduler portion of module 1007 works with VA state monitor 1005, which in turn has connection to the application dialog controller, which in turn has connection to the telephony hardware facilitating client connection to voice applications. Therefore module 1007 can apply changes to the application and maintain orphan state until all of the accessing callers are interacting with the new configuration in a seamless matter. At that point the orphans (old files and settings) may be purged from the system.

Application 826 has a task state/completion notification module 1010 provided therein and adapted to send notification of the completed task to the task author or administrator through server port interface 1000. Module 1010 also has connection to change-order cache interface 1001 for the purpose of purging the cache of any data associated with a task that has been completed successfully.

In one embodiment of the present invention, module 1010 may send, through interface 1000, an error notification or an advisory notification related to a change-order task that for some reason has not loaded successfully or that cannot be implemented efficiently. In the latter case, it may be that due to an unusually heavy call load using an existing application a change-order may be better scheduled during a time when there are not as many clients accessing the system. However, this is not required in practice the present invention as during change-order implementation, nodes are treated individually in terms of caller access and as long as the new changes are implemented from the bottom up callers may be transferred from an orphan, for example, to a new object in a dialog tree until such time that that orphan may be replaced or deleted and so on.

Application 826 may be provided as a software application or routine that takes instruction directly from the change-orders it receives. In one embodiment of the present invention application 826 may be provided to run on a piece of dedicated hardware as firmware, the hardware having connection to the voice system. There are much possible variant architecture that may be used without departing from the spirit and scope of the present invention.

Figure 11:
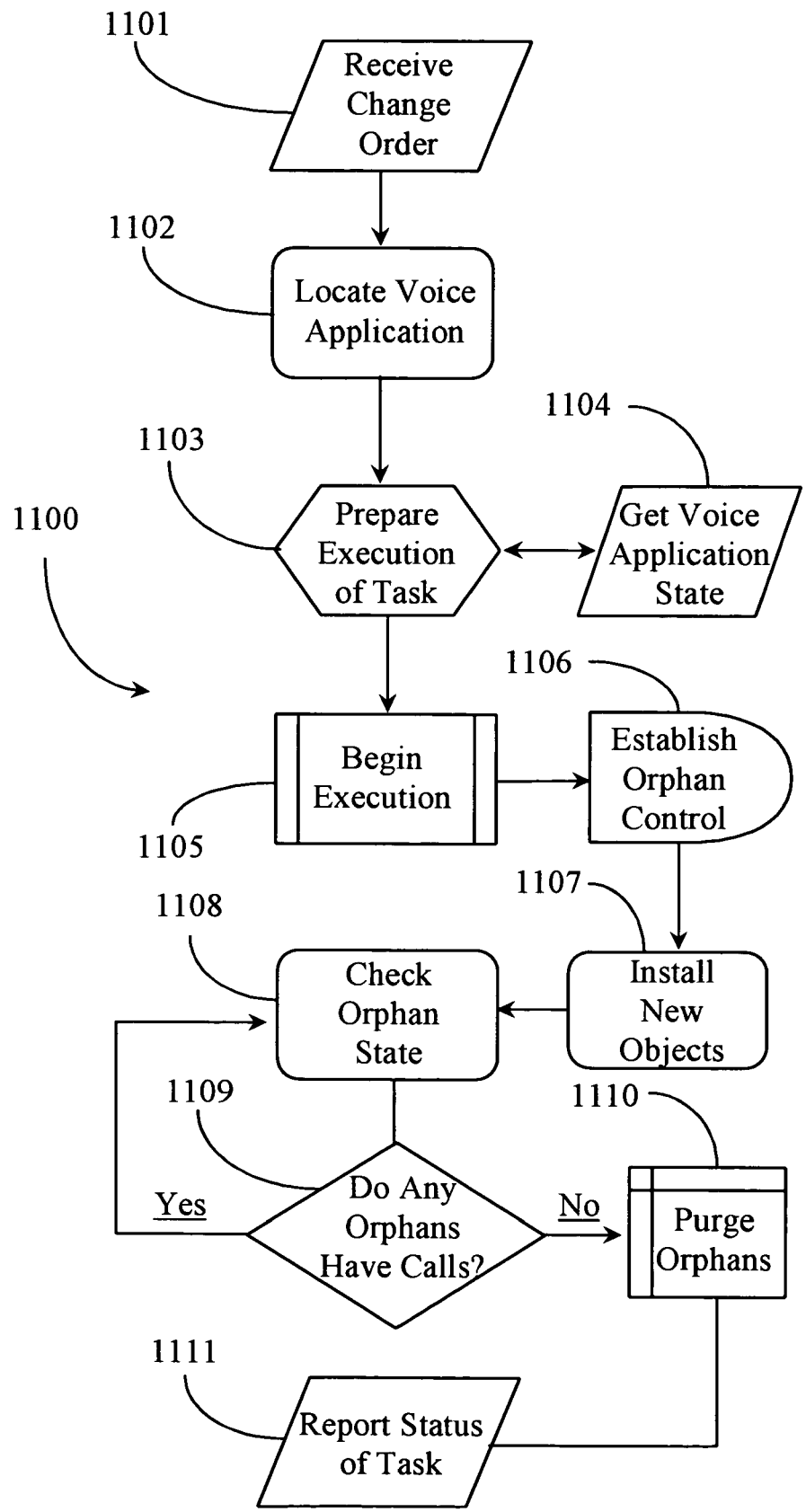
FIG. 11 is a process flow chart illustrating steps for receiving and implementing a change-order according to an embodiment of the present invention.

FIG. 11 is a process flow chart 1100 illustrating steps or receiving and implementing a change the according to an embodiment of the present invention. At step 1101, a change-order is received by the system. In step 1101, the actual files of the change-order may be cached in a cache memory and the change-order instructions, which in one embodiment are of the form of an executable bitmap or object model, are loaded into a task loader analogous to loader 1003 of FIG. 10 for processing.

At step 1102, the system locates the voice application that is the target of the change-order. In one embodiment of the present invention, the target voice application may not be in current use. In this case, the changes may be implemented without concern for active state of the application interaction with clients. In another embodiment the target voice application may be currently in use with one or more of callers interacting with it. Assuming the latter case at step 1103, the system prepares for execution of the change implementation task. At step 1104, the current running state of the voice application is acquired. This information may include the total number of callers currently interacting with the application and their current positions of interaction with the application. Step 1104 is an ongoing step meaning that the system constantly receives current application state with respect to the number of callers and caller position in the dialog flow of the application.

At step 1105, execution of the change-order begins. At step 1106, any orphans in the old application are identified and maintained from the top or root node of the application down the hierarchy until they are idle or not in a current state of access from one or more clients. At step 1107, any new objects being applied to the application are built into the application from the bottom up toward the root node of the application. In step 1106, orphan control is established with respect to all of the components of the application that will be replaced or modified. Establishing orphan control involves identifying the components of the application that will be deleted, replaced, or modified, and establishing an orphan state of those components. The orphan state enables clients that are already queued for interaction with those components to traverse those components in a seamless manner.

At step 1108, the state of each orphan established in the target voice application is continually checked for an opportunity to purge the orphan and allow a new object to take over that position in the dialog. At step 1109, it is decided whether those orphans checked have any callers interacting with them. At step 1110, if an orphan has callers interacting, the process reverts back to step 1108 for that orphan. All established orphans might, in one embodiment, be monitored simultaneously. At step 1108, if an orphan does not have calls interacting then at step 1109 that orphan may be purged if the new component associated therewith is already in place to take over from the orphan as a result of step 1107.

In one embodiment of the present invention, a change is implemented only when a last maintained orphan of a tree is free of calls. Then the next orphan up is continually monitored in step 1108 until it is free of calls. In one embodiment however, if a change-order is only to modify certain content or style of one or more voice prompts of an application but does not change the intent or direction of the interaction flow with respect to caller position, then any orphan in the tree may be purged at step 1110 when it is not in a current interaction state. At step 1110, a new object associated with an orphan immediately takes over when an orphan is purged. If an orphan has no replacement node it is simply purged when it is not currently in use.

In a preferred embodiment of the present invention at steps 1106 and 1107, the code portion of the new configuration provides all of the required linking functionality for establishing transient or temporary linking orders from prompt to prompt in a dialog. Therefore, an orphan that is still in use, for example, may be temporarily linked to a new node added further down the dialog tree. When that orphan is purged, a new object (if in place) takes over the responsibilities of caller interaction and linking to further objects. At step 1111, the system reports status of task implementation.

In one embodiment of the present invention, files are actually swapped from cache to permanent storage during configuration. For example, a new component may not be inserted into the voice application until the final orphan being maintained in the tree is cleared of callers for a sufficient amount of time to make the change over and load the actual file or files representing the new object. The next orphan above a newly inserted object may be automatically linked to the new component so that existing callers interacting with that orphan can seamlessly traverse to the new component in the application enabling lower orphan nodes to be purged. This process may evolve up tree of the voice application until all of the new objects are implemented and all orphans are purged.

In a preferred application of the present invention, new objects are installed immediately after orphans are established at step 1106. In this embodiment, the new objects are installed side-by-side with the established orphans accept in the case where an orphan is deleted with no modification or replacement plan. In this case, the new components are selected to immediately take over during a lull in interaction when there are currently no callers interacting with that portion of the tree. New objects may also be added that do not replace or conflict with any existing files of a voice application. In this case no orphan control is required. Code and linking instruction in a new configuration is applied to the old configuration in the same manner as voice file prompts.

In one embodiment, transitory links are established in a new configuration for the purpose of maintaining application dialog flow while new objects are installed. For example, 2 links, one to an orphan and one to the new component may be provided to an existing component that will be affected. If an orphan has current callers but the node below it has none, the orphan can automatically link to the new object even though it is still being used.

One with skill in the art will recognize that the process order of flowchart 1100 may very according to the type of implementation. For example, if a change-order includes the physical voice files and code replacements and those are handled by the application, then at step 1107 installing new objects may include additional subroutines involving moving the objects from cache memory to permanent or semi-permanent storage. If the physical voice files and code replacements are preloaded into a database and then accessed during the configuration implementation, then step 1107 may proceed regardless of orphan status, however the new components are activated only according to orphan status.

The method and apparatus of the present invention can be implemented within or on a local area network, or from a remote point of access to a wide area network including the Internet network without departing from the spirit and scope of the present invention. The software of the present invention can be adapted to any type of voice portal that users may interact with and that plays voice files according to a pre-determined order. The method and apparatus of the present invention, in light of many possible embodiments, some of which are described herein should be afforded the broadest possible scope under examination. The spirit and scope of the present invention is limited only by the following claims.

What is claimed is:

1. A system for configuring and implementing changes to a voice application dialogue, comprising:

a first workspace in an interactive graphics user interface (GUI) displaying an original voice dialogue graphically as a connected series of prompts;

a second workspace in the interactive GUI to edit the voice dialogue displayed in the first workplace;

selectable tools in the user interface to edit or replace voice associated with individual ones of the prompts;

a graphical library in the GUI for a user to select dialogues to change each dialogues associated with a voice application or a voice application server where the dialogues are currently used; a connection to a data network; and a deploy function selectable by an icon in the GUI wherein the deploy function determines a number of voice systems and voice application servers using the original voice dialogue;

wherein, upon selection from the library, a dialogue is displayed in original form in the first workplace, and may be edited in the second workplace, and upon selection of the deploy function the edited version is transmitted via the data network to the voice systems and the voice application servers using the original dialogue, whereupon the voice systems and the voice application servers begin using the edited version, and the edited version becomes a new original version in the library.

2. The system of claim 1 wherein the edited versions include one or more of new voice prompts or voice prompt sequences for a voice application.

3. The system of claim 1 wherein the edited versions include one or more of new code modules.

4. The system of claim 1 wherein the edited version is deployed to an interactive voice response unit coupled to a telephony switch.

5. The system of claim 1 wherein the edited version is deployed to an interactive voice server connected to a data network.

6. The system of claim 1 wherein the data network is a local-area-network.

7. The system of claim 1 wherein the data network is a wide-area-network.

8. The system of claim 1 wherein the data network includes a local-area-network, the public-switched-telephone-network, and the Internet network.

9. The system of claim 1 wherein the edited version is deployed to a voice application in a current state of running.

10. A method for configuring and implementing changes to a voice application dialogue, comprising:

(a) selecting an original voice dialogue from a graphical library of dialogues associating the dialogues with voice applications and servers where they are used, and displaying the original voice dialogue graphically as a connected series of prompts in a first workspace in an interactive graphics user interface (GUI);

(b) editing the original voice dialogue in a second workspace in the interactive GUI, by selecting and using tools in the GUI for editing or replacing voice associated with individual ones of the prompts, creating thereby an edited version of the original;

(c) determining a number of voice systems and voice application servers using the original dialogue; and (d) deploying the edited version to the voice systems and the voice application servers using the original dialogue over a connected data network, whereupon the edited version replaces the original version in the library.

11. The method of claim 10 wherein the edited versions include one or more of new voice prompts or voice prompt sequences for a voice application.

12. The method of claim 10 wherein the edited versions include one or more of new code modules.

13. The method of claim 10 wherein the edited version is deployed to an interactive voice response unit coupled to a telephony switch.

14. The method of claim 10 wherein the edited version is deployed to an interactive voice server connected to a data network.

15. The system of claim 10 wherein the data network is a local-area-network.

16. The method of claim 10 wherein the data network is a wide-area-network.

17. The method of claim 10 wherein the data network includes a local-area-network, a public-switched-telephone-network, and an Internet network.

18. The method of claim 10 wherein the edited version is deployed to a voice application in a current state of running.

* * * * *